(12) United States Patent
Underwood

(10) Patent No.: US 11,047,124 B2
(45) Date of Patent: Jun. 29, 2021

(54) SAND SEEPAGE STREAM AND WETLAND RESTORATION SYSTEM AND METHOD FOR ECOLOGICAL RESTORATION

(76) Inventor: Keith R. Underwood, Annapolis, MD (US)

( * ) Notice: Subject to any disclaimer, the term of this patent is extended or adjusted under 35 U.S.C. 154(b) by 1690 days.

(21) Appl. No.: 11/482,891

(22) Filed: Jul. 10, 2006

(65) Prior Publication Data

US 2007/0160424 A1 Jul. 12, 2007

Related U.S. Application Data

(60) Provisional application No. 60/697,390, filed on Jul. 8, 2005.

(51) Int. Cl.
*E03F 1/00* (2006.01)
*E02B 3/00* (2006.01)
*E02B 3/18* (2006.01)

(52) U.S. Cl.
CPC ............... *E03F 1/002* (2013.01); *E02B 3/00* (2013.01); *E02B 3/18* (2013.01); *Y02A 10/00* (2018.01); *Y02A 40/22* (2018.01)

(58) Field of Classification Search
CPC .. E02B 3/00; E02B 3/02; Y02A 10/22; Y02A 40/228
USPC ......... 405/52, 53, 55, 80, 87, 116, 107, 118; 210/747, 170.01
See application file for complete search history.

(56) References Cited

U.S. PATENT DOCUMENTS

| | | | | |
|---|---|---|---|---|
| 1,374,817 A | * | 4/1921 | Bridges | E02B 7/16 405/90 |
| 2,277,286 A | * | 3/1942 | Bechtner | E02B 3/16 405/107 |
| 2,382,010 A | * | 8/1945 | Hodges | C02F 3/24 210/602 |
| 4,209,388 A | * | 6/1980 | DeFraites | 210/602 |
| 4,876,004 A | * | 10/1989 | Verhoeff | B01D 17/0208 210/170.08 |
| 5,174,897 A | * | 12/1992 | Wengrzynek | 210/602 |
| 5,389,166 A | * | 2/1995 | White | B09B 1/00 112/420 |
| 5,416,257 A | * | 5/1995 | Peters | E02D 19/14 405/128.15 |
| 5,893,975 A | * | 4/1999 | Eifert | 210/602 |
| 5,951,866 A | * | 9/1999 | Grove et al. | 210/602 |
| 5,960,890 A | * | 10/1999 | Crain | 172/166 |
| 6,120,210 A | * | 9/2000 | Hsu | E03F 1/002 405/36 |

(Continued)

FOREIGN PATENT DOCUMENTS

JP 06180008 A * 6/1994 ............... E02B 7/00

OTHER PUBLICATIONS

Fahrenthold, David A. "Refreshing the Bay by Restoring Bogs" Washington Post, Nov. 11, 2004, p. AA14.*

(Continued)

*Primary Examiner* — Tara Mayo-Pinnock
(74) *Attorney, Agent, or Firm* — Michael Best & Friedrich LLP

(57) ABSTRACT

A system and method for restoring wetland habitats and providing a platform on which indigenous and transplanted plant species can thrive. Water from a source, such as, stormwater run-off is captured and filtered through a combination of sand berms and riffle weirs to a series of aquatic beds, thus creating nutrient-rich environment.

26 Claims, 5 Drawing Sheets

(56) References Cited

U.S. PATENT DOCUMENTS

| | | | | |
|---|---|---|---|---|
| 6,709,199 B2* | 3/2004 | Peyton | ............... | B65G 5/00 |
| | | | | 210/170.07 |
| 6,755,972 B1* | 6/2004 | Kouloumbis | ............ | C02F 3/327 |
| | | | | 210/602 |
| 6,840,710 B2* | 1/2005 | Peters | ............... | E03B 3/36 |
| | | | | 405/57 |
| 6,841,071 B2* | 1/2005 | Gonzalez | ............... | 210/602 |
| 7,832,959 B1* | 11/2010 | Groen | ............... | E02B 3/00 |
| | | | | 405/52 |
| 2001/0026731 A1* | 10/2001 | Fukui | ............... | 405/16 |
| 2002/0187006 A1* | 12/2002 | Burns, II | ............ | E02B 8/085 |
| | | | | 405/81 |

OTHER PUBLICATIONS

Atlantic White Cedar: Ecology, Restoration, and Management. Proceedings of the Arlington Echo Symposium, Millersville, Maryland, Jun. 2003, USDA Forest Service GTR-SRS-91, p. 54-61.*

Georgia Stormwater Management Manual, Technical Handbook, vol. 2, Aug. 2001, First Edition, Appendix D.*

R. Newbury, M. Gaboury, The Use of Natural Stream Characteristics for Stream Rehabilitation Works Below the Manitoba Escarpment, Canadian Water Resources Journal. 13 (1988) 35-51. doi:10.4296/cwrj1304035.*

J. Powder, Tree Revival Takes Root in Arundel, The Baltimore Sun. (2001).*

S. Babakaiff, D. Hay, C. Fromuth, Rehabilitating Stream Banks, Fish Habitat Rehabilitation Procedures. 9 (1997) 94-116.*

S. McKerrow, ed., Shipley's Choice Elementary School, The Severn River Log. 92 (2002) 6.*

Powder, Jackie. "Arundel Project Seeks Wildlife's Return to Stream" Baltimore Sun, Dec. 30, 2001, p. 166. (Year: 2001).*

San Luis Obispo Creek Waterway Management Plan, Drainage Design Manual, vol. III, Feb. 2003, p. 38-49 and Appendix A p. 2 of Glossary. (Year: 2003).*

Washington Department of Fish and Wildlife, Stream Habitat Restoration Guidelines (2004), Drop Structures, Sep. 2004, p. 478-514.. (Year: 2004).*

* cited by examiner

SAND SEEPAGE STREAM AND WETLAND RESTORATION SYSTEM AND METHOD FOR ECOLOGICAL RESTORATION

CROSS REFERENCE TO RELATED APPLICATIONS

This application is an application filed under 35 U.S.C. § 111(a) claiming benefit pursuant to 35 U.S.C. § 119(e)(1) of the filing date of the Provisional Application 60/697,390 filed on Jul. 8, 2005 pursuant to 35 U.S.C. § 111(b).

FIELD OF THE INVENTION

This invention relates generally to a method and system for creating and restoring stream and wetland habitats that can sustain particular indigenous and transplanted animal and plant life. More particularly, the present invention relates to a method and system that incorporates a sand seepage environment conducive to retaining nutrients and other constituent components necessary for various plants and animals to thrive.

BACKGROUND OF THE INVENTION

Many streams, creeks, rivers and other inland waterways, particularly those in urbanized environments, have been significantly degraded over the course of the last one hundred years. More particularly, increased areas of impervious surface, such as roads, parking lots, and rooftops, have reduced the base flow of these waterways, resulting in lowered water tables and 'flashier' streams with more erratic flows. This causes the waterways to convey dramatically smaller volumes and velocities of water under base flow conditions than the same waterways would convey after precipitation events.

The increase in storm water volume, in conjunction with an increase in water flow velocity, have cut into and increased stream channel depths, (i.e., reduced inverts) leaving vertical banks, eroded stream channels and a reduction in groundwater table elevations, thus, exacerbating the problem. Specifically, the erosion creates depositional features downstream, destroying ecosystems and creating navigational hazards which, in some cases, results in the need for dredging. To put this in perspective, for each ton of deposition in the channel, seven tons of bank erosion can be expected to have occurred. This, in turn, sets up the habitat for a disturbance regime of invasive and low quality plants, such as, phragmites and cut grass. Additionally, when the silt is released into peatlands, a transition of the bog habitats results, leading to a 'common' disturbance-tolerant plant community, rotting peat, and the release of additional nutrients.

In related art methods of addressing the above issues, storm water is diverted from impervious surfaces into streams and rivers in a manner that transfers the water from the impervious surfaces to the waterways as quickly as possible. This approach generally involves either piping the water into outfalls or directing it down concrete lined channels directly into the waterways. These conventional methods have caused untold erosion and destruction to streams, creeks, and rivers.

During the last twenty years or so, the work of Dr. David Rosgen, a hydrologist from Colorado, has been recognized as being at the forefront of much of the "stream restoration" efforts taking place in the United States. The so-called Rosgen Methods consist largely of 're-sizing' and aligning the stream channel to safely convey water and sediment through the project reach. This is typically accomplished by enlarging or reducing the channel cross section, raising or lowering the channel invert, stabilizing stream banks through grading and/or hardening them with rock, root wads, and bioengineering practices, such as, soil wraps, live branch layering, etc., and directing the stream's thalweg, i.e., the line defining the lowest points along the length of a river bed, through riffles and pools using various structures, such as, rock vanes, etc., to accommodate the bank-full discharge (e.g., the "one and a half year storm event").

The related art methods described above can be used to accomplish reconnection of the stream with its floodplain through raising the channel's invert, excavating the floodplain, or other techniques. The key benefits of these systems are that they provide bank stabilization and result in reduced generation of in-channel sediment by re-establishing stream competence as a result of hardening the channel with rip-rap, logs, or other rigid material, thus preventing erosion of the channel.

One problem with related art methods, however, is that many designers often fail to pay attention to site conditions and instead work from 'cookbook' recommendations or past project experience and knowledge. These 'cookbook' recommendations often either fail to account for individual variations in the site, or are based on inappropriate reference sites. For instance, the Rosgen methods were developed in mountainous western United States and are not based on urban hydrology. Conventionally-designed projects provide little to no water quality treatment benefit. They allow the sediment that enters the system to quickly leave the system, ideally, in a manner that does not convey any additional sediment from the project area.

Many of these related art projects are constructed without regard for materials native to the project site. For instance, traditional materials often used in the coastal plains region of the United States, e.g., limestone rip-rap, raises pH levels and discharges calcium and manganese into historically nutrient poor environments, further disrupting the flora and fauna of the area. This approach does not work well in urbanized coastal plains regions where sediments transferred include pollutants that are discharged into coastal bays; pollutants such as mercury and lead that were historically sequestered in peatlands at the headwater streams in the coastal plains. Destruction of these ecosystems has removed the peat "sponge" that typically absorbed these pollutants and resulted in a release of mercury and other heavy metals as a result of the rotting of the peat.

It is, thus, desirable to provide a system and method of stream and wetland restoration that avoids the problematic issues described above and is capable of accepting urban, as well as naturally occurring, storm water run off to further provide an environment where indigenous as well as transplanted plant life can thrive.

SUMMARY OF THE INVENTION

The present invention addresses the issues described above. In at least one embodiment of the invention, a seepage wetland system is provided that comprises an entry point from which water enters the system, an entry pool operable to collect water entering from the entry point, an aquatic bed operable to hold water, and at least one riffle weir operable to transition water from the entry pool to the aquatic bed, wherein the water level within the aquatic bed is lower than the water level within the entry pool.

Given the following enabling description of the drawings, a system and method commensurate with the present invention should become evident to a person of ordinary skill in the art.

DETAILED DESCRIPTION OF EXEMPLARY NON-LIMITING EMBODIMENTS

Figure 1:
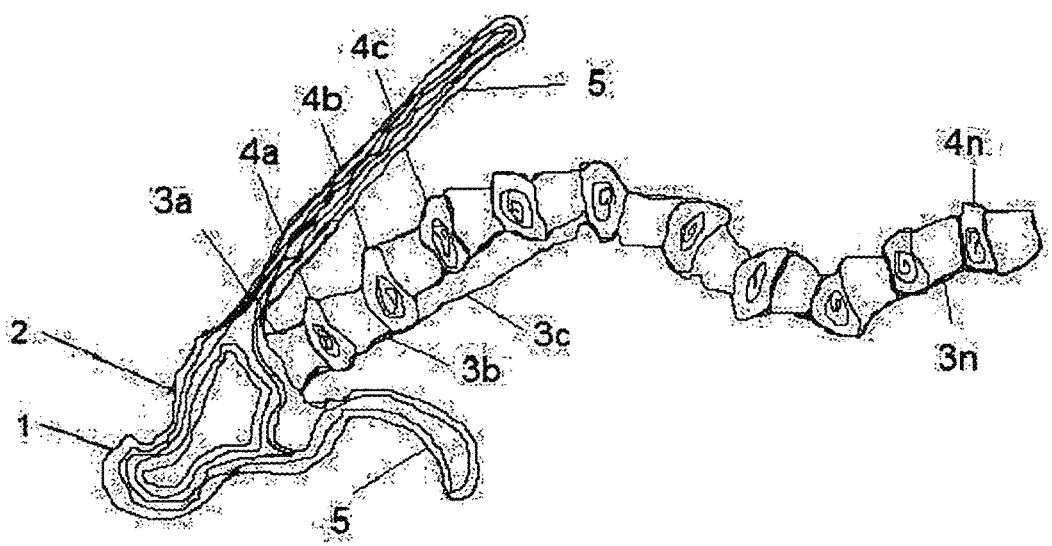
FIG. 1 is an illustration of an overall seepage wetland system in accordance with the present invention.

Before describing exemplary, non-limiting embodiments in accordance with the present invention, a number of terms are defined to assist the reader. The terms defined are components of a seepage wetland system in accordance with the present invention.

Primary seepage reservoir—water reservoir designed to irrigate porous media (sand or gravel), spread water out along the outer regions of a project site to detain the first flush of storm water into a project site at the highest elevation possible on the given site.

Seepage Reservoirs—Sand berms are placed in appropriate positions in the landscape to capture surface and/or groundwater.

Sand Berm seepage wetland—A berm of sand designed to contain a seepage reservoir filter and exfiltrate water stored in a seepage reservoir and support plant growth, microbes, algae, fungi and macro-invertebrates.

Sand berm level spreader—A berm of sand designed to spread stormwater across a broad area to dissipate erosive energies and support plant growth and populations of microbes, algae, fungi and macro-invertebrates.

Sand seepage bed—A bed of sand is placed in the drainage way (e.g. eroded ravine) and Riffle weirs grade control structures and pools form the new surface topography over top of the sand bed. This allows some water to filter under the surface and exfiltrate as a seep.

Primary Riffle weir grade control structure—sets water surface elevation in a primary seepage reservoir at the highest grade possible on a given site, higher than receiving body of water e.g. adjacent Wetland pool or stream Channel.

Riffle weir grade control structures—a grade control structure comprised of boulders and gravel that concentrate low water flow in a stream or water coarse and spreads storm water out to sheet flow, raise stream inverts to allow stormwater access to flood plains or impound shallow water.

Created aquacludes—Clay lens or other impervious layer installed below porous soil (sand or gravel bed) to direct water through porous soils.

Shallow aquatic beds—pools created with the placement of a riffle weir grade control structure in a water course.

Peatland vegetation—The systems can be designed to support peat forming vegetation and accumulate peat. Appropriate native plant species such as Atlantic White Cedar, sphagnum, nymphaea and cranberry can be planted in appropriate zones of project sites designed with these methods to accrete peat. This can result in carbon storage, improved water quality, endangered species recovery sites.

In accordance with one embodiment of the present invention, peatland plant species that exist only under a very narrow set of environmental conditions which are easily altered by common human activities is directly addressed. One of ordinary skill in the art will understand that other uses and benefits can be derived from the present embodiment. However, to clearly describe the invention, the present embodiment is described in the context of the preservation of peatland plant species.

More particularly, as a result of years of human activity similar to that which is described above, natural populations of all rare plants associated with peatlands in the state of Maryland have declined over the past 200 years. At the current rate of loss, extirpation of most of these species, on extant sites on the western shore of the Chesapeake Bay, will occur before the year 2100, if not sooner. Investigations of extant peatland ecosystems have revealed that ex-filtrating groundwater through sandy soils is closely associated with these ecosystems. The applicant's efforts to restore populations of peatland species on the Western Coastal Plain of Maryland in Anne Arundel County, for example, have led to the development of a system of techniques and construction methods designed to create an appropriate habitat for this rare biotic community.

In particular, according to the present embodiment, a system has been developed that includes aquacludes, seepage reservoirs, sand berms and shallow pools. The system was designed to replicate the above-mentioned conditions within appropriate landscapes. This so-called Sand Seepage Stream and Wetland Restoration Technique can be adopted to address a diverse suite of problems. For example, the system can been used to address infrastructure, stormwater management, nutrient reduction, educational, mine reclamation, stream restoration, reforestation, fish passage, wetland and forest mitigation, recreational, shoreline stabilization and aesthetic needs. Further, the system and its attendant methods and techniques are easily adaptable to other geomorphic settings and physiographic provinces, where, for example, they could enhance the chances of survival of peatland and other equally valuable ecosystems.

The present embodiment represents a holistic, ecosystem restoration approach which generally addresses problems associated with stormwater, the quantity of surface water as well as the quality of the water. Some benefits that can be expected from utilizing the present embodiment include, raising groundwater, creating wetlands and reconnecting to the floodplain. These benefits are derived at least partially by downsizing the channel to accommodate only the base flow. A system consistent with the present embodiment also detains large volumes of water on the landscape. Many existing flood plain wetlands can be restored to their former status as peatlands by implementing at least one of the individual techniques associated with the embodiment.

Referring to FIG. 1, a system according to the present exemplary embodiment comprises of a number of so-called "building blocks." An entry point 1, e.g., a stormwater drainage pipe, swale, etc., provides incoming water to the system. The water output from entry point 1 is gathered in entry pool 2 which can be of various sizes and depths depending on the topography and size of the area accommodating the system. Entry pool 2 is created by the position of the uppermost riffle weir grade control structure 3a (referred to throughout as weir or riffle-weir). Other weirs, 3b-3n are placed downstream from weir 3a and form the shape of a channel. Weirs 3a-3n control the water surface elevations (WSE) in a seepage reservoir 5 extending along the outer edges of the flood plain. Also, between each weir, 3a-3n, a shallow pool 4a-4n is created as water runs over and/or through a respective weir.

By creating reservoirs 5, as shown, the largest wetted perimeter is provided at the highest elevation possible on the given site. Weir 3a also controls the release of the water into the main channel. As a result of this configuration the water level is raised above the invert of the channel, which is created by the series of weirs 3a-3n and pools 4a-4n, and hydrology is reconnected to the flood plain. Additionally, stormwater quality and quantity are attenuated.

Figure 2:
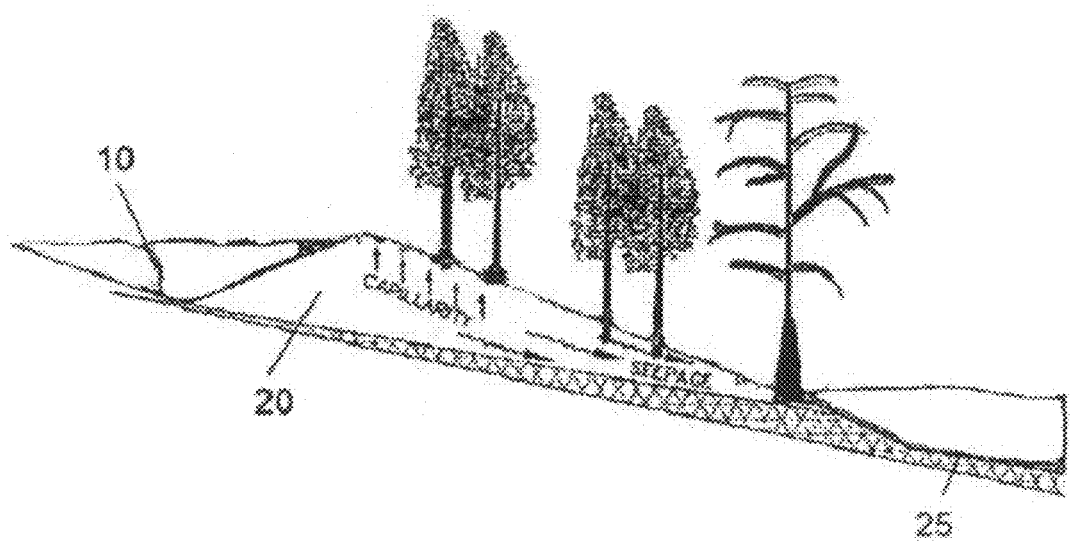
FIG. 2 is an illustration of a sand berm element of a seepage wetland system in accordance with the present invention.

Referring to FIG. 2, a close-up of an exemplary sand seepage element according to the invention is illustrated. In particular, sand berm 20 is created between the seepage reservoir 10 and the aquatic beds of the main channel 25. Sloped sand berm 20 creates and contains the reservoir 10 and allows water to filter into the stream channel 25. For example, the top of the sand berm 20 is higher, e.g., between 1-3' higher, than the water surface elevation (WSE) of the main channel 25, thus enabling the water seep through the sand from reservoir 10 to the pools of channel 25. The filtered water enters the stream channel 25 as cooler, cleaner, groundwater.

According to a further aspect of the invention, sand berm 20 is designed such that it is placed into its final position as a berm and can serve as a haul road for construction of other project features. Sand berm 20 also functions as a level spreader, such that stormwater overtops it and the water is forced to sheet flow along the entire length of the berm 20. During construction of the system in accordance with the invention, coarse organic material, such as wood chips or stump grindings, can be placed over the surface of the sand berm 20 to support equipment traffic. As berm 20 is brought into its final grade, the wood chips can be incorporated into the berm as a growing medium for peatland species.

Figure 3:
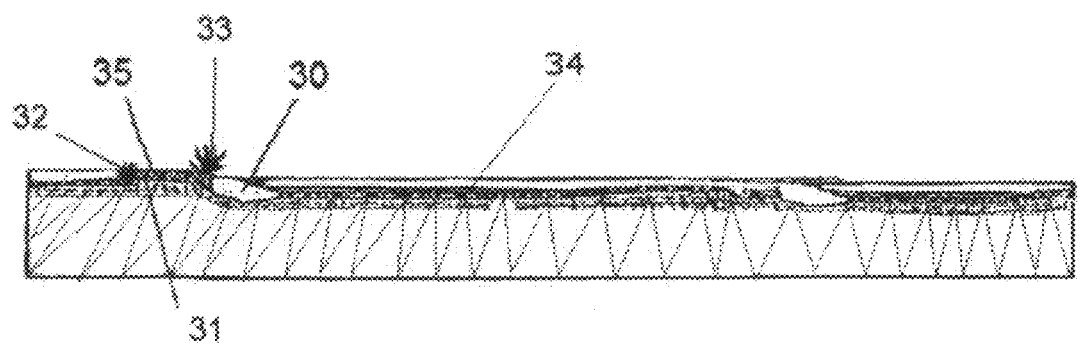
FIG. 3 is a side view illustration of two riffle weir elements of a seepage wetland system in accordance with the present invention.

Referring to FIG. 3, another element of a system in accordance with the present invention is a riffle weir grade control structure (3a-3n in FIG. 1). As shown, the riffle weir control structure according to the embodiment of FIG. 3 comprises two portions. One or more boulders 30, weighing up to several tons is placed in a parabolic shape as a grade control, and cobbles 35 are placed behind the boulder(s) to create lift in the form of a stream riffle. Cobbles 35 serve to concentrate low flow, which allows fish passage, and force the high flows to backwater, and eventually sheet flow over the weirs. This increases the width of the flow and reduces flow depth and velocity, reducing the potential for scour and sediment transport. This feature is one of the many features that make the present invention more desirable than other, conventional, systems in which there is very little increase in width of flow, resulting in a dramatic increase in depth and velocity of flow during storm events.

According to the present embodiment, sandstone, such as, limonite, bog iron or ferracrete, are used for boulders 30 as the grade control. This material is native to the Atlantic coastal plain region, and naturalizes quickly on the site. Other materials, such as granite or limestone may be more appropriate in projects sited in other regions of the country. Further, depending on the stability and/or elevation of the substrate, it may be appropriate to place polyester geotextile underneath the boulders to prevent shifting.

A system as shown in FIG. 3 is designed for a non-erosive flow during the so-called "100-year flood" event and to concentrate base flow and maximize wetland habitat conditions. The embodiment illustrated is exemplary only and other configurations can be employed consistent with the invention. In particular, the process of designing a system in accordance with the invention involves collecting topographic data, defining the stream reach for the anticipated work area, and setting all of the existing conditions as parameters of the design.

For example, the following exemplary method is employed for laying out the project features. First, the stream channel length r is calculated. Next, the elevation difference, height=h, between the top of the system, such as the stormwater pipe 1 in FIG. 1, and bottom of the site is calculated. As shown in the equation below, reach r is divided by the height h and the result is divided in half. The resulting distance is then used as both the length of the weirs and length of pools in the project.

$$(r/h)/2 = \text{length of pools} = \text{length of weirs}$$

One of ordinary skill in the art would know how to calculate the width of the weir. For example, standard engineering practices, such as TR-55 (i.e., Urban Hydrology for Small Watersheds, Technical Release-55 (June, 1986). United States Department of Agriculture, Natural Resources Conservation Service), Rock Chute 503 (i.e., United States Department of Agriculture, Natural Resources Conservation Service), and TR-20, the contents of which are incorporated herein by reference for all that they teach, can be used to calculate the width of the weir(s) based on cobble size and by determining the velocities and energies delivered to the first of a plurality of weirs during the one hundred year storm event. As an example, in Annapolis, Md., 7.2 inches of precipitation falling in a 24-hour period signifies the one hundred year storm event.

Figure 4:
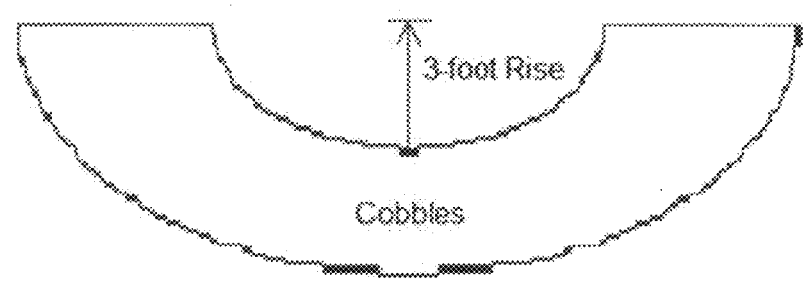
FIG. 4 is graphical cross-sectional representation of a boulder portion of a riffle weir element of a seepage wetland system in accordance with the present invention.

Furthermore, although not necessary for proper functioning of the system, it is suggested that stone indigenous to the locale be used to construct the weirs. For instance, silica cobbles and sandstone boulders are appropriate native materials for areas of the Atlantic coastal plain. Also, as shown in FIG. 4, the cobble portion of the weir, i.e., the cobble-weir, according to this embodiment is formed in a parabolic shape. Also, the cobble-weir rises, in cross-section, from the low point in its center to two high points at its outermost edges. For example, as shown in FIG. 4, a three-foot rise is provided.

According to at least one embodiment, each weir is constructed to have a one-foot lift from front to back in profile. For example, the elevation difference from the top of the boulder 30 to the back of the cobbles 35 in FIG. 3 is approximately one foot. Further, the footer boulder(s) 30 are submerged at least half their depth in the shallow aquatic bed in front of them. A depth of cobble of at least two times the average diameter of the stones is placed behind the footer boulders 30, constituting most of the size of each weir. The cobbles on the backside of the weir, identified by number 31 in FIG. 3, are placed at a 3-to-1 grade. That is, to hold the cobbles in place within the preceding pool, the cobbles are sloped at a 3-to-1 grade.

Figure 5:
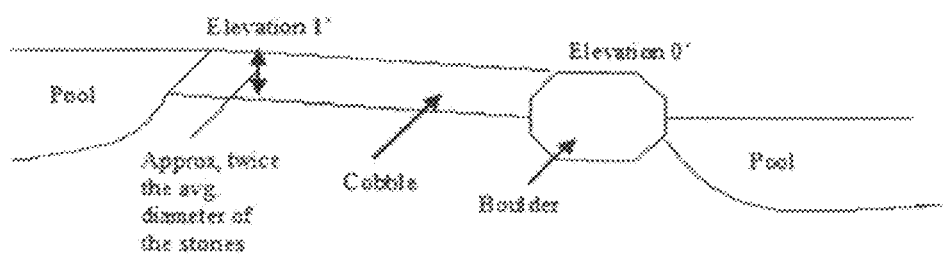
FIG. 5 is a close-up side view graphical representation of a riffle weir element of a seepage wetland system in accordance with the present invention.

A further graphical representation of the dimensions of the riffle weir structure according to an embodiment of the invention is shown in FIG. 5. More particularly, as shown, if the top of the boulder (30 in FIG. 3) is taken as the zero elevation point, then the top of the cobbles (20 in FIG. 3) are at approximately one foot above the top of the boulder. Further, the cobbles are placed at a depth of two times their diameter. For example, a cobble bed consisting of six inch diameter cobbles would be placed to a minimum depth of approximately twelve inches.

According to an exemplary method for constructing the weir system illustrated in FIGS. 3-5, it is suggested to begin at the lowest elevation by placing the footer boulders. Then, fill-in behind the boulders with cobble to the design length and width of the weir, and create a one foot rise from front to back, as shown in FIG. 5. The elevation of the top of the preceding weir (e.g., elevation 1') should be the elevation of the base of the next weir upstream.

Figure 6:
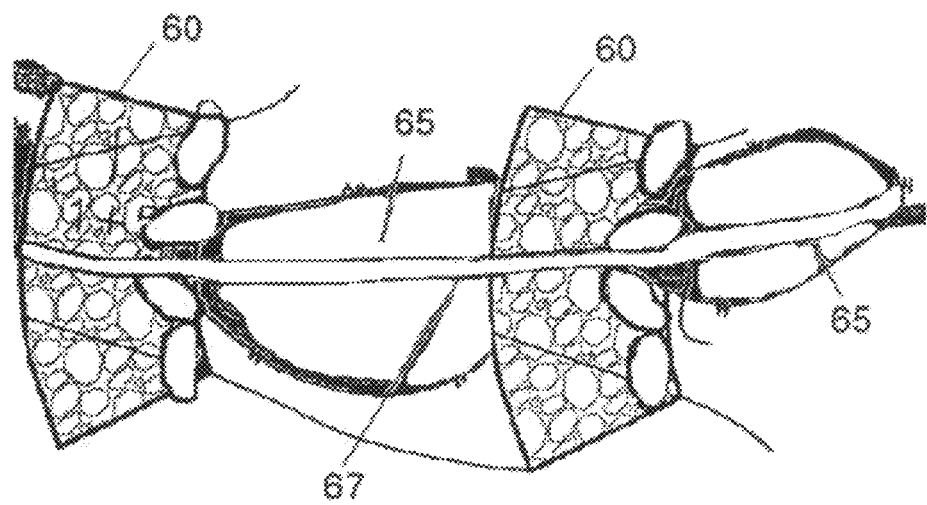
FIG. 6 is a close up top view illustration of two riffle weir elements of a seepage wetland system in accordance with the present invention.

Placement of the riffle weir grade control structures creates shallow aquatic beds as shown in FIG. 6. Each weir 60 is placed to slightly flood the soils behind it, creating a shallow pool 65. This serves to further dissipate stormwater energies and creates shallow aquatic beds in the floodplain. According to this embodiment, the depth of beds 65 is limited to be no greater than six-feet to maximize the designed wetland habitat values. However, a skilled artisan would appreciate that various depths and dimensions for pools 65 can be used depending on the layout of the land being serviced.

According to at least one of the embodiments of the invention discussed thus far, a further element comprises planting appropriate peatland, plant species native to the region where the system is located. For example, with respect to the Atlantic coastal plain, a partial native species planting list comprises at least one of, Cinnamon Fern (Osmunda cinnamomea), Royal Fern (Osmunda regalis), Bushy Bluestem (Andropogon glomeratus), Tussock Sedge (Carex stricta), Nodding Ladies' Tresses (Spiranthes cernua), Blue Flag (Iris versicolor), American Water Lily (Nymphaea odorata), Golden Club (Orontium aquatica), Purple Pitcher Plant (Sarracenia purpurea), Buttonbush (Cephalanthus occidentalis), Sweet Pepperbush (Clethra alnifolia), St. John's Wort (Hypericum species), Inkberry (Ilex glabra), Virginia Sweetspire (Itea virginica), Sheep Laurel (Kalmia augustifolia), Mountain Laurel (Kalmia latifolia), Swamp bayberry (Morella caroliniensis), Wax Myrtle (Morella cerifera), Dwarf Azalea (Rhododendron atlanticum), Swamp Azalea (Rhododendron viscosum), Highbush Blueberry (Vaccinium corymbosum), Cranberry (Vaccinium macrocarpon), Atlantic White Cedar (Chamacyparis thyoides), White Fringetree (Chionanthus virginicus), American Holly (Ilex opaca), Eastern Red Cedar (Juniperus virginiana), Sweetbay Magnolia (Magnolia virginiana), Southern Yellow Pine (Pinus echinata), Pitch Pine (Pinus rigida), Pond Pine (Pinus serotina), Blackjack Oak (Quercus marilandica), Water Oak (Quercus nigra), Post Oak (Quercus stellata), and Bald Cypress (Taxodium distichum). Native plant lists in other climates or geologic regions may differ significantly. Many states as well as the federal government have resources available to help individuals identify native, as well as rare, threatened, and endangered plant species in their area.

Figure 7:
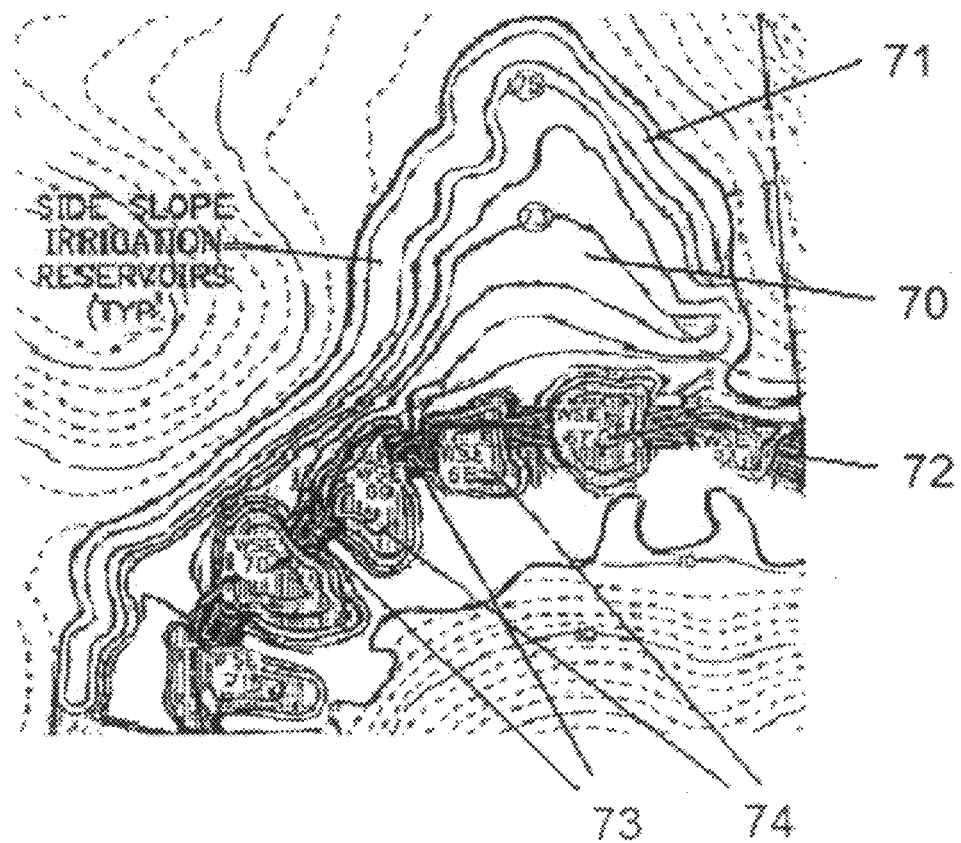
FIG. 7 is close up view of a seepage reservoir in accordance with the present invention.

FIG. 7 illustrates a detailed embodiment of a seepage reservoir in accordance with the invention. In particular, sandy seepage slopes are created by water passing through the sand berm 70 from the reservoir 71 to the main channel 72. As illustrated, main channel 72 comprises riffle weir structures 73 and shallow pools 74, similar in construction to those previously described in accordance with other embodiments.

The seepage reservoir structure shown in FIG. 7 provides a habitat for a number of species. According to one embodiment, the species supported are rare, threatened and endangered species of plant and aquatic life. The plant species can be used to stabilize sand and create habitat for other species. Aquatic plant species are planted in the shallow water to initiate peat production. Sphagnum mosses, grasses, sedges, rushes, and cranberry are optionally planted along the water's edge to form peat that will eventually creep out onto the surface waters either as floating mats of peat or rooted mats of peat.

As the vegetation accumulates on the riffle weir grade control structures, sediment accumulates along the edges of the low flow channel and plants colonize the edges of the channel. Those emergent species most acclimated to submersion attempt to colonize in faster moving water until there is a balance and a stable channel results. As these species attempt to colonize the stable substrate of cobble from the edges, the plant stems slow the flow of water and concentrate base flow until the emergent plants cannot withstand the water in the channel. Thus, standing water on the weir and maximizing channel depth over their weir. This provides maximum fish passage potential.

A system according to the present invention often captures sediments, plant parts, and nutrients. Further, they accrete organic soils (peat) where the sediment inputs are sufficiently low to be captured in the peat and utilized by plant growth. This sediment collects in the shallow aquatic pools around structures in the pools, like rootwads turned upside down, and on the flood plain and along edges of the grade control structures.

That is, the development of hummocks, low mounds of earth in wetlands, streams, or swamps that can serve as sites for plant growth, can be facilitated by placing tree stumps upside in a wetland or semi-permanent pool so that the trunk is embedded in the substrate or otherwise stable. The roots of the inverted stump touch the water surface, so as to allow them to collect floating plant material and sediment. Appropriate woody and herbaceous plant species can then be planted onto the rootwad. Water from higher elevations in the system can be piped over the surface of the rootwad to establish planted species such as bald cypress. Pipes can be removed once the plants' roots touch the permanent water surface elevation in the larger wetland. And, as it does, the elevation of the system slowly rises, at a relatively uniform rate.

Figure 8:
FIG. 8 is a detailed illustration of a further embodiment of a seepage wetland system in accordance with the present invention.

FIG. 8 illustrates a further embodiment of the present invention in which a system similar to that which is shown in FIG. 1 is combined with a seepage reservoir system similar to that which is shown in FIG. 7. In particular, a system similar to the one shown in FIG. 1 is shown at the top of FIG. 8, where an entry point allows water to flow into the system and is retained in a collecting pool. Seepage reservoirs extend out as "arms" on either side of the collecting pool and sand berms such as those shown in FIG. 2 are provided between the seepage reservoirs and the main channel. The main channel comprises a series of riffle weirs and shallow pools as previously described and water from the collecting pool is permitted to run over the top of an intitial weir when the water level in the collecting pool rises above the top of the cobble portion of the initial weir.

As previously described in connection with other embodiments, the water travels down the main channel from one pool to the next, over and or through an adjacent weir, once the level in the upstream pool rises above the top of the next weir. This process continues until the bottom of the system is reached which is identified by the final pool at the bottom of the main channel.

There are two independent seepage reservoirs shown in the system of FIG. 8. One is on the left-hand side of the main channel and the other is on the right-hand side of the channel. These independent seepage reservoirs, i.e., that are not fed by the collecting pool at the head of the main channel, provide a water source for water to seep through sand berms in the manner previously discussed to create a habitat for various plants and animals to thrive.

It is important to remember that the present invention is an integrated ecosystem restoration approach. For example, the sand berms alone will not work as free-standing water filters over time. Left unattended, they would eventually likely clog, cease filtration, and fail. However, when constructed in combination with seepage reservoirs, and formed as level spreaders, providing safe conveyance of storm flows, and combined with the establishment of a diverse native plant community, they become alive with appropriate biological activity from fungi and microbes to macroinvertebrates to various plants and animals.

One result of utilizing a system in accordance with the invention is that the sand becomes tumultuous with activity, maintaining the porosity of the sand bed. When combined with root production, the development of root channels and berms in these systems becomes increasingly more stable and more porous with time. Coastal plains reference streams increase base flow to the stream by storing rain events as groundwater in the flood plain, and are bounded by a flood plain comprised largely of organic soils with a reach of increases in surface elevation from base flow associated with normal rainfall events in the watershed.

Additional benefits are also afforded as a result of a system according to the present invention. For example, the present invention delivers water quantity attenuation, moderating flows downstream, and reducing the flashiness of streams by allowing stormwater flows to get onto the flood plain and back into the ground, increasing the time of concentration, and storing water on site. In this way, they act like a detention basin with additional storage capacity. More particularly, the sand that makes up the features on site has approximately a 40 percent void ratio, meaning that every 100 cubic feet of sand on site has the capacity to store 40 cubic feet of water during a storm event, and slowly release it as ex-filtrating groundwater into the main channel as the water surface elevation at the site drops.

Also, water quality improvements are provided through, attenuation, nutrient uptake by plants, buried plant parts forming organic soils, sequestration through organic processes, de-nitrification, in-filtration, ex-filtration, and sedimentation. These methods increase the base flow of streams by raising the groundwater and reconnecting storm flows to formerly unsaturated soils in the native geology, to be released back into the stream as ex-filtrating ground water later.

A system according to the present invention restores ecological diversity and creates habitat for fish, amphibians, reptiles which is orders of magnitude larger than conventional methods. These techniques consistently result in far more wetland creation and water storage on-site than do conventional approaches. A system in accordance with the invention, further, represents a unique opportunity to engage the community and to involve it in helping to restore threatened plant species to the human-shaped landscape. Finally, economic analyses of these methods have shown that they consistently return several times more value to the entities implementing them than they cost to design and build. The value of the wetland creation, stream restoration, and water storage has generally ranged from 3 to 8 times greater than the cost to get the project in the ground.

As has been mentioned throughout, the present invention can be used in all sorts of stream and wetland restoration applications. The inventive system can also replace conventional stormwater outfalls from culverts or pipes. It can be used in "rain garden" type applications alongside buildings or in highway medians to safely convey, detain, and infiltrate stormwater runoff from impervious surfaces. Systems according to the invention represent an ideal opportunity to move away from conventional stormwater holding ponds and towards sites that provide extensive stormwater attenuation, community benefit, and vital habitat. In instances where man-made structures (e.g. dams) or natural processes have caused blockages to fish migration, these systems can be used to restore fish passage and restore habitat. Finally, each of these instances where these methods are applied represents an ideal opportunity to participate in the restoration of rare, threatened, and endangered plant species populations that are often found in these peatland habitats.

The exemplary and alternative embodiments described above may be combined in a variety of ways with each other. Furthermore, the steps and number of the various steps illustrated in the figures may be adjusted from that shown without straying from the spirit of the invention.

It should be noted that the present invention may, however, be embodied in many different forms and should not be construed as limited to the embodiments set forth herein; rather, the embodiments set forth herein are provided so that the disclosure will be thorough and complete, and will fully convey the scope of the invention to those skilled in the art. The accompanying drawings illustrate exemplary embodiments of the invention.

Although the present invention has been described in terms of particular exemplary and alternative embodiments, it is not limited to those embodiments. Alternative embodiments, examples, and modifications which would still be encompassed by the invention may be made by those skilled in the art, particularly in light of the foregoing teachings.

Those skilled in the art will appreciate that various adaptations and modifications of the exemplary and alternative embodiments described above can be configured without departing from the scope and spirit of the invention. Therefore, it is to be understood that, within the scope of the appended claims, the invention may be practiced other than as specifically described herein.

I claim:

1. A seepage wetland system comprising:
   an entry point from which water enters the system;
   an entry pool operable to collect water entering the system from said entry point;
   a first aquatic bed operable to retain water and permit the retained water to seep into the ground; and
   a first weir operable to transition water from said entry pool to said first aquatic bed, wherein a water level within said first aquatic bed is lower than a water level within said entry pool and said first weir includes;
   at least one boulder portion adjacent said first aquatic bed; and
   a plurality of cobbles adjacent said at least one boulder portion,
   wherein said cobbles are formed in a parabolic shape and rise, in cross-section, from a low point in its center to a high point at an outermost edge and the water from said entry pool runs over said cobbles and an upper portion of said boulder portion as it transitions from said entry pool to said first aquatic bed and at least half of said at least one boulder portion is submerged in said first aquatic bed.

2. The seepage wetland system according to claim 1, wherein said entry pool comprises a main portion and at least one leg portion extending outward from said main portion.

3. The seepage wetland system according to claim 2 further comprising a sand berm located between said at least one leg portion and said first aquatic bed, wherein water from said at least one leg portion seeps through said sand berm and into said first aquatic bed.

4. The seepage wetland system according to claim 1 further comprising a channel, wherein said channel comprises a plurality of aquatic beds each disposed between two respective weirs forming said channel.

5. The seepage wetland system according to claim 4, further comprising vegetation accumulated on outer edges of said channel.

6. The seepage wetland system according to claim 1, further comprising: a second aquatic bed operable to hold water; and a second weir disposed between said first and second aquatic beds, wherein said second weir includes at least one second boulder portion adjacent said second aquatic bed and a plurality of cobbles adjacent said at least one second boulder portion, and is operable to transition water from said first aquatic bed to said second aquatic bed and wherein, further, a water level within said second aquatic bed is lower than the water level within said first aquatic bed.

7. The seepage wetland system according to claim 1, wherein said cobbles form a cobble bed with a thickness equal to at least twice the average diameter of said cobbles.

8. The seepage wetland system claimed in claim 7, wherein the cobbles are each approximately six-inches in diameter and placed at a grade of at least 3 to 1.

9. The seepage wetland system according to claim 1, wherein an elevation at a back portion of said cobbles located adjacent said entry pool is higher than an elevation at the top of said at least one boulder portion.

10. A method of creating a seepage wetland, the method comprising:
providing an entry pool operable to collect water;
creating a first riffle weir adjacent the entry pool, wherein the riffle weir includes a plurality of cobbles directly adjacent the entry pool and at least one boulder opposite the entry pool and wherein the elevation from the top of said at least one boulder to an uppermost portion of said cobbles is approximately one foot,
wherein said cobbles are formed in a parabolic shape and rise, in cross-section, from a low point in its center to a high point at an outermost edge and the water from said entry pool runs over said cobbles and an upper portion of said boulder portion as it transitions from said entry pool to said first aquatic bed and at least half of said at least one boulder portion is submerged in said first aquatic bed.

11. The method of creating a seepage wetland claimed in claim 10, further comprising: allowing water from the entry pool to flow over the riffle weir; and collecting the water flowing over the riffle weir to form a first aquatic bed.

12. The method of creating a seepage wetland claimed in claim 11, further comprising creating a sand berm between a leg portion extending out from an edge of the entry pool and the first aquatic bed, wherein a water level of the entry pool is higher than a water level of the first aquatic bed.

13. The method of creating a seepage wetland claimed in claim 12, further comprising permitting water to seep through the sand berm from the entry pool to the first aquatic bed.

14. The method of creating a seepage wetland claimed in claim 13, further comprising growing vegetation on a surface of the sand berm.

15. A riffle weir for creating an environment conducive for growing vegetation, the riffle weir comprising:
a cobble weir adjacent a first body of water having a first water elevation, said cobble weir including a plurality of cobbles formed in a parabolic shape, said cobble weir having an uppermost surface higher than the first water elevation of the first body of water; and
a boulder portion adjacent said cobble weir at a side of said cobble weir opposite the first body of water, said boulder portion including a top surface having an elevation lower than the elevation of the uppermost surface of said cobble weir.

16. The riffle weir claimed in claim 15, wherein said boulder portion is disposed between said cobble weir and a second body of water having a second water elevation lower than the first water elevation.

17. The riffle weir claimed in claim 16, further comprising a geotextile material disposed under at least a portion of the riffle weir.

18. The riffle weir claimed in claim 16, further comprising: a first side adjacent the first body of water; and a second side adjacent the second body of water, wherein the first side is longer than the second side.

19. The riffle weir claimed in claim 15, wherein said cobble weir has a thickness dimension approximately equal to twice the average diameter of the cobbles.

20. A system comprising:
a channel located in or on the ground at a geographic location and defining a path through which water flows from a first end of said channel to a second end of said channel;
at least one riffle weir positioned along said channel and arranged to transition water from a first level to a second level, wherein the second level is lower than the first level, each of said riffle weirs including,
a weir pool having first and second ends formed along said channel and being operable to hold water;
one or more first rocks positioned at the first end of said weir pool, each of said first rocks having top and bottom surfaces and front and back sides, wherein the front side of said first rocks faces the first end of said weir pool and the top surface of at least one of said first rocks is higher than the water level in said weir pool; and
a plurality of second rocks located adjacent to the back side of said first rocks, wherein the back side of said first rocks faces said second rocks, wherein each of said second rocks is smaller than each of said first rocks.

21. The system recited in claim 20, wherein said plurality of second rocks associated with at least one of said riffle weir forms a layer of second rocks having a front side adjacent to said first rocks and a back side away from said first rocks, wherein the back side of said layer of second rocks is higher than the front side of said layer.

22. The system recited in claim 21, wherein said layer of second rocks has a thickness approximately equal to twice an average diameter of the second rocks associated with said layer.

23. The system recited in claim 22, wherein said layer of second rocks is formed in a parabolic shape.

24. The system recited in claim 21, wherein said at least one riffle weir includes a first riffle weir and second riffle weir, each of said first and second riffle weirs being disposed along said channel, wherein the back side of said layer of second rocks associated with said first riffle weir receives water from said weir pool associated with said second riffle weir and directs the water towards said one or more first rocks associated with said first riffle weir.

25. The system recited in claim 21, further comprising:
- an entry point located at the first end of said channel and directing water into the system; and
- an entry pool receiving water from said entry point and being operable to hold the water, wherein said at least one riffle weir includes a first riffle weir adjacent to said entry pool, and
- when a water level in said entry pool rises above the back side of said layer of second rocks associated with said first riffle weir, water flows over said layer towards the first rocks associated with said first riffleweir, and
- when a water level at the front side of said layer of second rocks rises above the top surface of the first rocks associated with said first riffle weir, water flows over the first rocks and into the weir pool associated with said first riffle weir.

26. The system recited in claim 20, wherein at least one of said first rocks is at least partially submerged in the ground.

* * * * *